United States Patent
Shimizu et al.

(10) Patent No.: US 11,638,930 B2
(45) Date of Patent: May 2, 2023

(54) POWDER COATING DEVICE AND POWDER COATING METHOD

(71) Applicant: Honda Motor Co., Ltd., Tokyo (JP)

(72) Inventors: Hiroomi Shimizu, Tochigi (JP); Kenji Miyanaga, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 96 days.

(21) Appl. No.: 17/216,624

(22) Filed: Mar. 29, 2021

(65) Prior Publication Data

US 2021/0299698 A1  Sep. 30, 2021

(30) Foreign Application Priority Data

Mar. 30, 2020 (JP) .............................. JP2020-060498

(51) Int. Cl.
  *B05C 19/06* (2006.01)
  *B05C 19/04* (2006.01)
(52) U.S. Cl.
  CPC .............. *B05C 19/06* (2013.01); *B05C 19/04* (2013.01)
(58) Field of Classification Search
  None
  See application file for complete search history.

(56) References Cited

U.S. PATENT DOCUMENTS

| | | | | |
|---|---|---|---|---|
| 3,167,442 A | * | 1/1965 | Brooks ................... | B05D 1/26 |
| | | | | 118/DIG. 5 |
| 3,486,484 A | * | 12/1969 | Bullough ................ | B05B 5/057 |
| | | | | 118/640 |
| 3,502,446 A | * | 3/1970 | Ayers ...................... | B22F 9/082 |
| | | | | 75/238 |
| 3,513,810 A | * | 5/1970 | Jackson ................... | B05B 5/14 |
| | | | | 118/308 |
| 3,653,544 A | * | 4/1972 | Young ..................... | B05C 19/02 |
| | | | | 177/114 |

(Continued)

FOREIGN PATENT DOCUMENTS

| | | |
|---|---|---|
| JP | 2013166099 | 8/2013 |
| JP | 2016131416 | 7/2016 |

(Continued)

OTHER PUBLICATIONS

Office Action of Japan Counterpart Application, with English translation thereof, dated Jan. 5, 2022, pp. 1-8.

*Primary Examiner* — Jethro M. Pence
(74) *Attorney, Agent, or Firm* — JCIPRNET

(57) ABSTRACT

Provided is a powder coating device. The powder coating device performs powder coating by inserting peeled parts at a lower end of a stator into a powder flow tank filled with a powder resin and includes: a surface height measurement part measuring a surface height of the powder resin; a peel height measurement part measuring a height of upper ends of the peeled parts; a swing part swinging the powder resin; an air supply part supplying air toward the powder flow tank via a porous body provided below an open bottom surface of the powder flow tank, and flowing the powder resin; and an adjustment part adjusting at least one of an air flow rate, a swing amount of the powder flow tank, an entry posture and an entry amount of the stator according to measurement results of the surface height measurement part and the peel height measurement part.

5 Claims, 11 Drawing Sheets

(56) References Cited

U.S. PATENT DOCUMENTS

| | | | | |
|---|---|---|---|---|
| 4,111,154 | A * | 9/1978 | Kissel | B05C 19/06 118/316 |
| 4,425,144 | A * | 1/1984 | Casperson | B01D 46/30 55/296 |
| 4,461,623 | A * | 7/1984 | Casperson | B01D 46/30 264/117 |
| 4,594,270 | A * | 6/1986 | Brooks | B01J 8/1872 427/249.1 |
| 5,338,339 | A * | 8/1994 | Westphal | B01D 46/0005 55/497 |
| 6,684,917 | B2 * | 2/2004 | Zhu | B01J 8/004 141/54 |
| 6,866,075 | B2 * | 3/2005 | Whitley | B65G 69/0458 141/34 |
| 7,971,991 | B2 * | 7/2011 | Davidson | B29C 64/35 347/108 |
| 8,426,670 | B2 * | 4/2013 | Nagasuna | A61F 13/53 604/368 |
| 9,555,439 | B2 * | 1/2017 | Svec | B05C 11/115 |
| 10,016,717 | B2 * | 7/2018 | Calafell | B01D 53/12 |
| 10,058,888 | B2 * | 8/2018 | Svec | E04D 1/20 |
| 10,773,423 | B2 * | 9/2020 | Cuyt | B05C 19/008 |
| 2014/0044871 | A1 * | 2/2014 | Svec | B05D 5/02 118/308 |
| 2015/0044365 | A1 * | 2/2015 | Svec | B05C 19/06 118/308 |
| 2016/0001319 | A1 * | 1/2016 | Svec | B05C 19/04 118/308 |
| 2018/0281237 | A1 * | 10/2018 | Frechman | B22F 12/70 |
| 2018/0281282 | A1 * | 10/2018 | Elgar | B29C 64/35 |
| 2018/0281283 | A1 * | 10/2018 | Frechman | B01D 46/0002 |
| 2018/0281284 | A1 * | 10/2018 | Elgar | B22F 12/00 |
| 2022/0339822 | A1 * | 10/2022 | Elgar | B29C 64/307 |

FOREIGN PATENT DOCUMENTS

| | | |
|---|---|---|
| JP | 2019018184 | 2/2019 |
| JP | 2019174149 | 10/2019 |
| JP | 2020040005 | 3/2020 |

* cited by examiner

| | | Peel height HB of coil segment | | | | |
|---|---|---|---|---|---|---|
| | | Overall shallow | Overall deep | Overall inclined | Locally deep | Locally uneven |
| Surface height HA of powder resin A | Overall high | No adjustment required | Increasing entry amount Increasing air flow rate | Changing posture | Increasing air flow rate locally (Increasing swing amount) | Increasing air flow rate locally |
| | Overall low | Increasing entry amount Increasing air flow rate | Increasing entry amount Increasing air flow rate | Changing posture Increasing air flow rate | Increasing air flow rate locally Increasing air flow rate locally (Increasing swing amount) | Increasing air flow rate locally |
| | Overall inclined | Changing posture Increasing air flow rate locally | Increasing entry amount Changing posture Increasing air flow rate locally | Changing posture Increasing air flow rate locally (Increasing swing amount) | Changing posture Increasing air flow rate locally (Increasing swing amount) | Changing posture Increasing air flow rate locally |
| | Locally low | Increasing air flow rate locally (Increasing swing amount) | Increasing entry amount Increasing air flow rate locally (Increasing swing amount) | Changing posture Increasing air flow rate locally (Increasing swing amount) | Increasing air flow rate locally (Increasing swing amount) | Increasing air flow rate locally |
| | Locally uneven | Increasing air flow rate locally | Increasing entry amount Increasing air flow rate locally | Changing posture Increasing air flow rate locally | Increasing air flow rate locally (Increasing swing amount) | Increasing air flow rate locally |

FIG. 9

POWDER COATING DEVICE AND POWDER COATING METHOD

CROSS-REFERENCE TO RELATED APPLICATION

This application claims the priority benefit of Japan application serial no. 2020-060498, filed on Mar. 30, 2020. The entirety of the above-mentioned patent application is hereby incorporated by reference herein and made a part of this specification.

BACKGROUND

Technical Field

The disclosure relates to a powder coating device and method.

Description of Related Art

A powder coating device for performing powder coating on a workpiece such as a coil segment of a stator used for a rotary electric machine is known. The powder coating device performs powder coating by flowing a powder resin filled in a powder flow tank and inserting the workpiece into the powder resin. When powder coating is performed to the coil segment of the stator, powder coating is performed to a peeled part where the insulating coating at the lower end of the coil segment is peeled off.

If the surface height of the powder resin filled in the powder flow tank is uneven, the quality of the powder coating of the workpiece may deteriorate. Therefore, Patent Document 1 discloses a powder coating device which measures the surface height of the powder resin at multiple points and notifies when the variation in the measurement results exceeds a predetermined index value. Further, Patent Document 2 discloses a powder coating device which measures the inclination of the surface of the powder resin and adjusts the insertion angle of the workpiece into the powder flow tank according to the measured inclination.

RELATED ART

Patent Document

[Patent Document 1] Japanese Laid-open No. 2019-174149
[Patent Document 2] Japanese Laid-open No. 2013-166099

However, in the conventional technique described in Patent Document 1 or 2, though the surface height of the powder resin is measured, since the powder resin is applied to the parts in addition to the peeled part of the workpiece to reliably ensure the insulating property, a large amount of the powder resin is consumed, and the quality of the powder coating is unstable.

In view of the above points, the disclosure provides a powder coating device and method capable of suppressing consumption of the powder resin and achieving stable powder coating.

SUMMARY

A powder coating device according to the disclosure performs powder coating by inserting multiple parts at a lower end of a workpiece where an insulating coating has been peeled off into a powder flow tank with closed sides and filled with a powder resin, and the powder coating device includes: a surface height measurement part which measures a surface height of the powder resin filled in the powder flow tank at multiple points; a peel height measurement part which measures a height of upper ends of the multiple parts of the workpiece where the insulating coating has been peeled off at multiple points; a swing part which vibrates the powder flow tank and swings the powder resin filled in the powder flow tank; an air supply part which supplies air toward the powder flow tank via a porous body provided below a bottom surface that is opened of the powder flow tank, and which flows the powder resin filled in the powder flow tank; and an adjustment part which adjusts at least one of a flow rate of the air, a swing amount of the powder flow tank, an entry posture of the workpiece with respect to the powder flow tank and an entry amount of the workpiece with respect to the powder flow tank according to measurement results of the surface height measurement part and the peel height measurement part.

BRIEF DESCRIPTION OF THE DRAWINGS

FIG. 9 shows a control amount to be adjusted in each pattern combination of the surface height of the powder resin and the height of the upper end of the peeled part.

DESCRIPTION OF THE EMBODIMENTS

Figure 1:
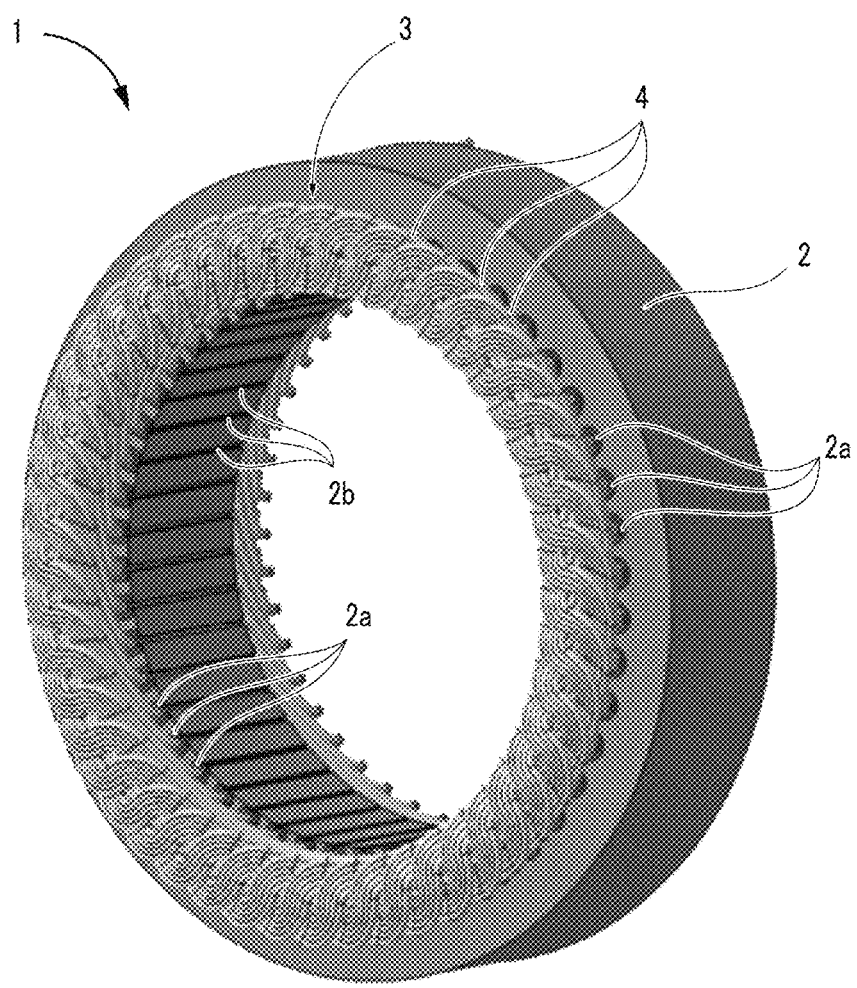
FIG. 1 is a perspective view showing a stator which is an example of a workpiece for powder coating by the powder coating device according to an embodiment of the disclosure.
Figure 2:
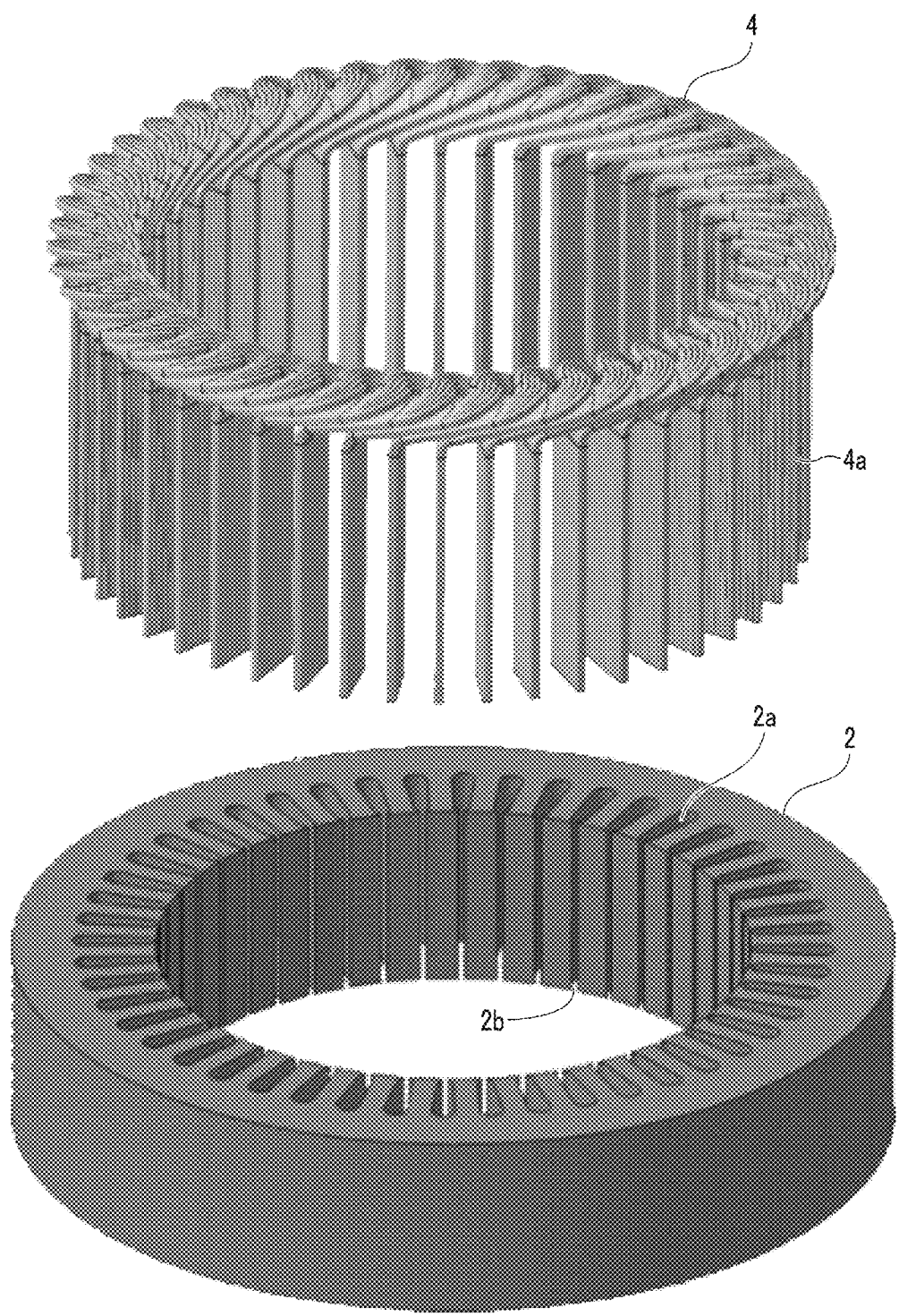
FIG. 2 is a perspective view showing a stator core and a coil segment of the stator.

According to the powder coating device according to the disclosure, at least one of the flow rate of the air, the swing amount of the powder flow tank, the entry posture of the workpiece with respect to the powder flow tank and the entry amount of the workpiece with respect to the powder flow tank is adjusted according to the measurement result of the surface height of the powder resin filled in the powder flow tank at multiple points and the measurement result of the height of the upper ends of the multiple parts of the workpiece where the insulating coating has been peeled off at multiple points. Therefore, it is possible to automatically perform appropriate adjustment after obtaining the combination of the variation in the surface height of the powder resin and the variation in the height of the upper ends of the peeled parts of the workpiece. In this way, it is possible to reliably perform powder coating on all of the peeled parts of the workpiece, and it is possible to suppress the consumption amount of the powder resin, whereby is possible to reduce the operation of adding the powder resin by the operator and the like.

In the powder coating device according to the disclosure, it is preferable that the adjustment part includes: a first determination part which determines adjustment of the entry posture of the workpiece and the entry amount of the workpiece, and a second determination part which determines adjustment of the flow rate of the air and the swing amount of the powder flow tank, and the second determination part determines the adjustment after the first determination part determines the adjustment.

When the entry posture and the entry amount of the workpiece whose adjustments are determined by the first determination part are adjusted, the entry posture and the entry amount of the workpiece change specifically, but even if the flow rate of the air and the swing amount whose adjustments are determined by the second determination part are adjusted, the state of the surface height of the powder resin does not change specifically. Therefore, if possible, the cycle time as a whole may be shortened by first making adjustments based on the determination of the first determination part, which may solve the defects reliably and quickly.

Further, in the powder coating device according to the disclosure, it is preferable that the surface height measurement part and the peel height measurement part simultaneously measure the height of the workpiece and the surface height of the powder resin in a same phase with respect to a circumferential direction of the powder flow tank.

In this case, it is possible to implement the disclosure by disposing the surface height measurement part and the peel height measurement part on the same member and moving the measurement points by these measurement parts. In this way, it is possible to simplify the device when powder coating is performed on an annular workpiece. Further, it is possible to eliminate the phase shift error between the measurement result of the powder surface height and the measurement result of the workpiece height.

A powder coating method according to the disclosure includes: filling a powder resin into a powder flow tank with closed sides; measuring a surface height of the powder resin filled in the powder flow tank at multiple points; measuring a height of upper ends of multiple parts at a lower end of a workpiece where an insulating coating has been peeled off at multiple points; vibrating the powder flow tank and swinging the powder resin filled in the powder flow tank; supplying air toward the powder flow tank via a porous body provided below a bottom surface that is opened of the powder flow tank and flowing the powder resin filled in the powder flow tank; inserting a part including the multiple parts at the lower end where the insulating coating has been peeled off with a predetermined entry posture of the workpiece into the powder resin flowing in the powder flow tank by a predetermined entry amount with respect to the powder flow tank; and adjusting at least one of a flow rate of the air, a swing amount of the powder flow tank, the entry posture of the workpiece with respect to the powder flow tank and the entry amount of the workpiece with respect to the powder flow tank according to the measured surface height of the powder resin and the measured height of the upper ends of the multiple parts of the workpiece where the insulating coating has been peeled off.

According to the powder coating method of the disclosure, it is possible to obtain the same action and effect as the powder coating device of the disclosure.

Hereinafter, a powder coating device 100 according to an embodiment of the disclosure will be described. First, a stator 1 for rotary electric machine, which is an example of a workpiece for powder coating by the powder coating device 100, will be described with reference to FIGS. 1 to 4.

The rotary electric machine is an electric motor, a generator, or the like, and is configured by the stator 1 formed in a cylindrical shape and a rotor (not shown) rotatably disposed inside the stator 1.

The stator 1 includes a stator core 2 and a coil 3. The stator core 2 is in a cylindrical shape, and slots 2*a* penetrating in the rotation axis direction are provided at intervals in the circumferential direction. Each slot 2*a* is formed so that the radial-direction cross-sectional shape of the stator core 2 extends radially from the center side of the stator core 2 in the radial direction, and each slot 2*a* communicates with the inner peripheral surface of the stator core 2 via a slit 2*b* formed in the stator core 2. Further, the slit 2*b* may not be provided.

Figure 3:
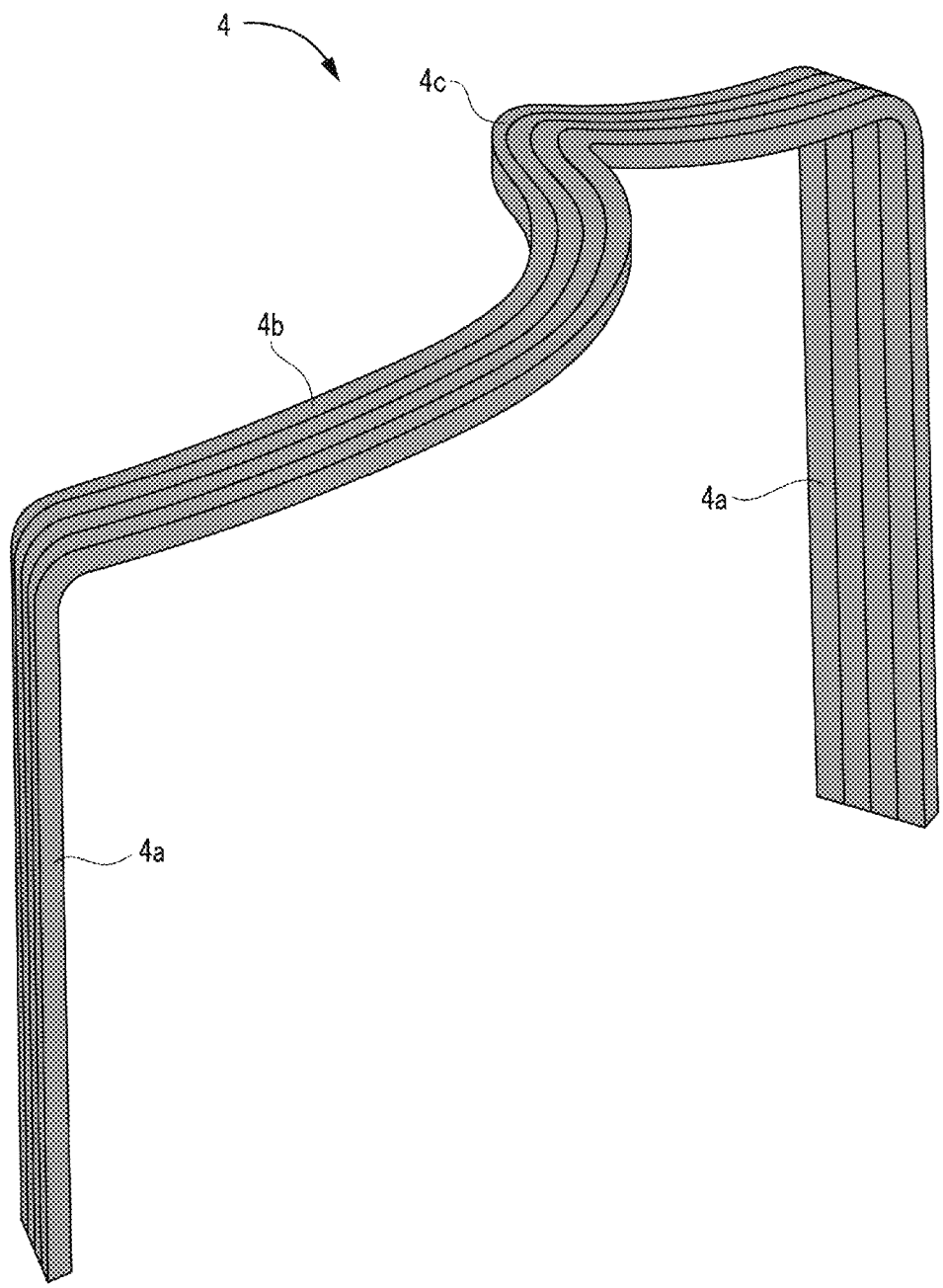
FIG. 3 is a perspective view showing the coil segment.

The coil 3 is configured by inserting coil segments 4 shown in FIG. 3 into the slots 2*a* from one side and bending protruding parts 4*d* protruding from the other side of the slots 2*a* in the circumferential direction for welding.

The coil segment 4 is formed by aligning multiple (four in the embodiment) conductors (flat wire conductor) having a rectangular cross section in a row so that the wider surfaces face each other and forming a bundle in a U shape, and is configured by a pair of legs 4*a* and 4*a* and a head 4*b* which connects one ends (upper ends in the figure) of both legs 4*a* and 4*a*.

In addition, the coil segment 4 may be a bundle in which multiple flat wires are aligned in the width direction. For example, multiple flat wires may be aligned in a row so that the narrower faces face each other.

An S-shaped part 4*c* which curves in an S shape in the alignment direction of the flat wires is formed at the center of the head 4*b*. Further, the head 4*b* is inclined downward from the center thereof (the center of the S-shaped part 4*c*) toward both legs 4*a* and 4*a*. The legs 4*a* of the coil segment 4 are inserted into the corresponding slot 2*a* from one side. The legs 4*a* of the coil segment 4 protrude from the other side of the slot 2*a*.

Figure 4A:
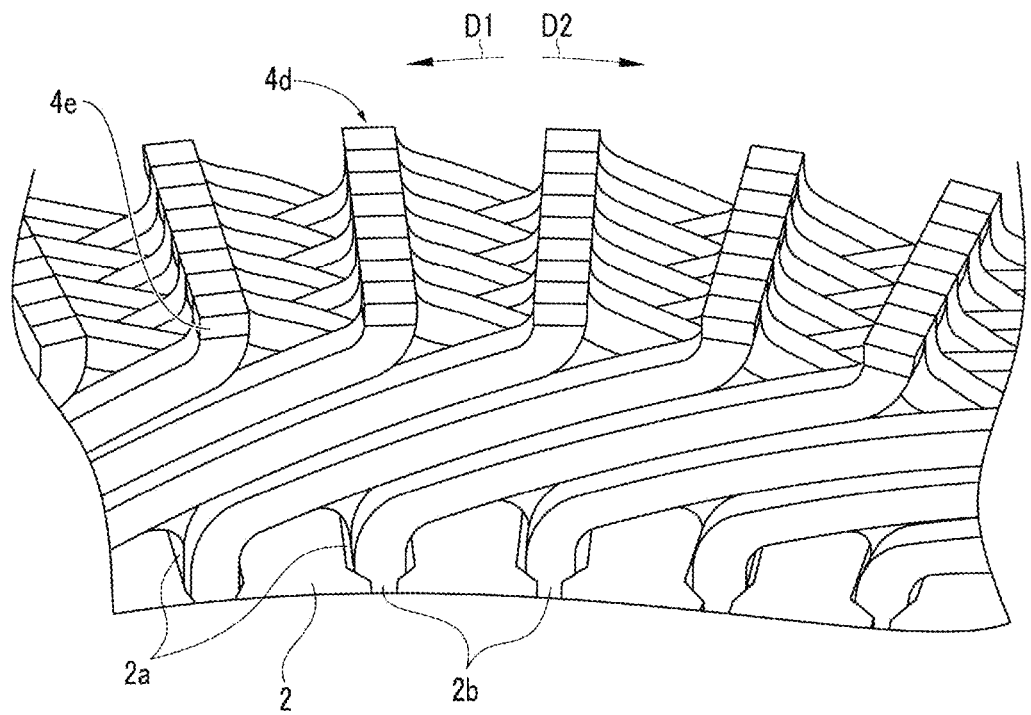
FIG. 4A is a perspective view showing a protruding part of the coil segment.

The coil segment 4 is insulated by an insulating coating (not shown), and a peeled part 4*e* where the insulating coating has been peeled off is formed at the tip of the leg 4*a* joined by welding or the like. As shown in FIG. 4A, the protruding parts 4*d* of the legs 4*a* protruding from the other side of the slot 2*a* are bent in the circumferential direction of the stator 1 by a bending device (not shown), and the peeled parts 4*e* at the tips of the corresponding protruding parts 4*d* are welded together. In this way, the stator 1 in which eight layers of (eight) coil segments 4 are stacked and disposed in the radial direction is completed. Here, a first layer, a second layer, . . . , and an eighth layer are disposed in this order from the outer side to the inner side in the radial direction.

In the completed stator 1, the peeled part 4e of the coil segment 4 is located at the lower end. In all the coil segments 4, the length of peeling the insulating coating, that is, the lengths of the peeled parts 4e are set to be equal. However, due to factors caused by the process of peeling the insulating coating, the process of bending the coil segments 4, the process of welding the coil segments 4, the process of stacking the coil segments 4 and the like, the height HB (see FIG. 5) of the upper end of the peeled part 4e of each coil segment 4 may vary.

Figure 4B:
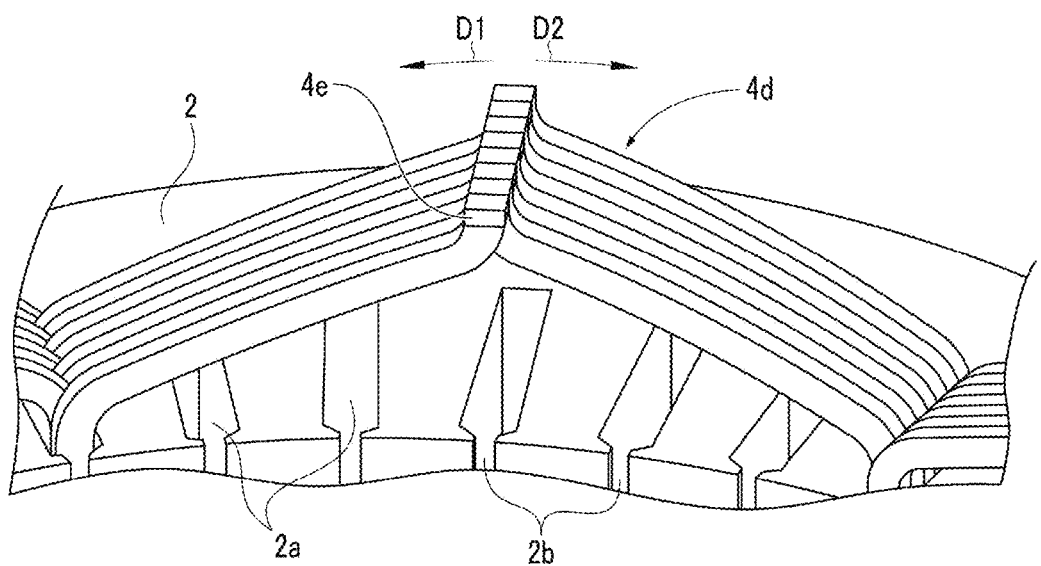
FIG. 4B is a perspective view showing a protruding part of the coil segment.

Further, here, the coil 3 is a three-phase coil configured by a U phase, a V phase, and a W phase, and the legs 4a of the coil segments 4 inserted into each slot 2a are disposed in the order of U phase, U phase, V phase, V phase, W phase, and W phase in the circumferential direction. In FIG. 4B, only one of the three phases of the coil (for example, the U-phase coil) is shown.

Figure 5:
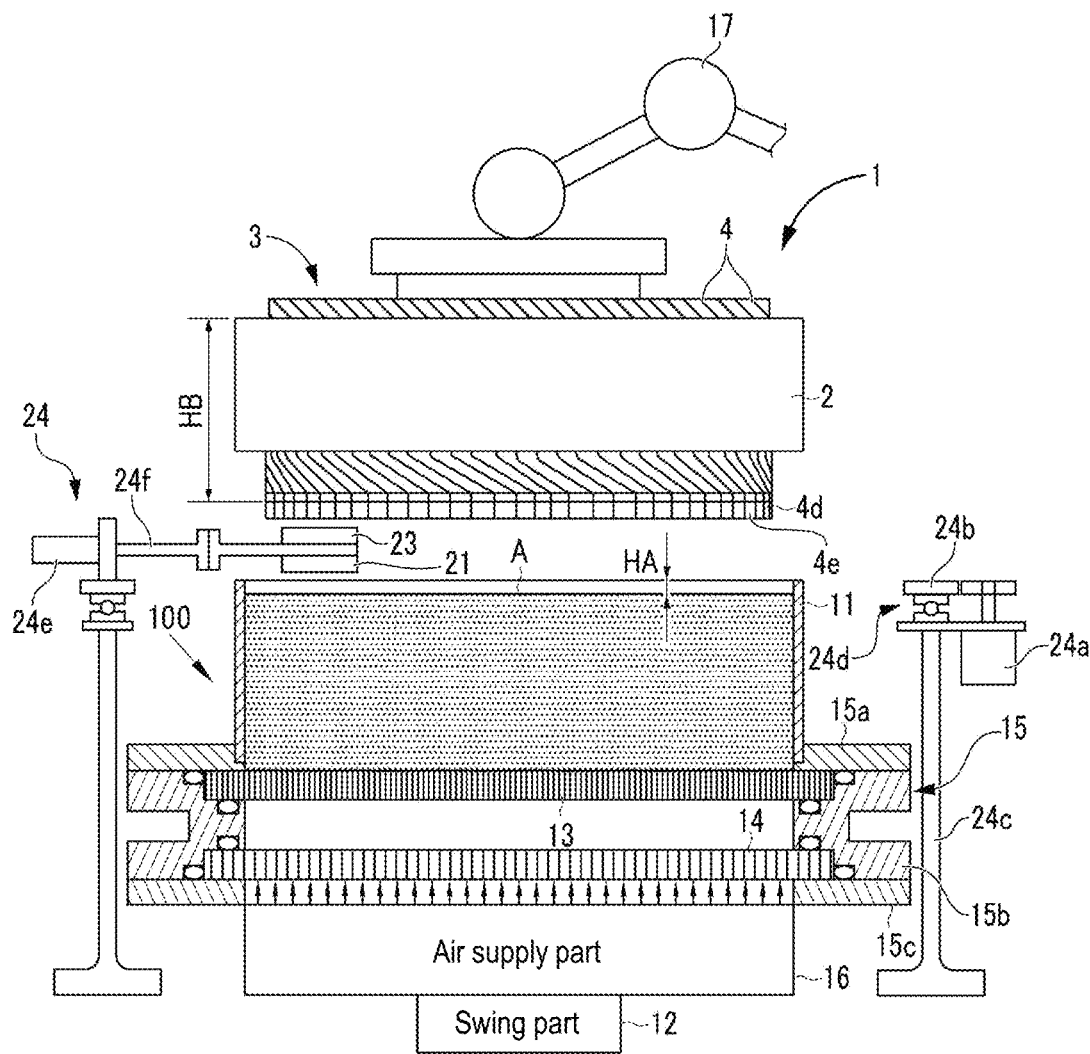
FIG. 5 is a schematic view schematically showing the powder coating device according to an embodiment of the disclosure.
Figure 6:
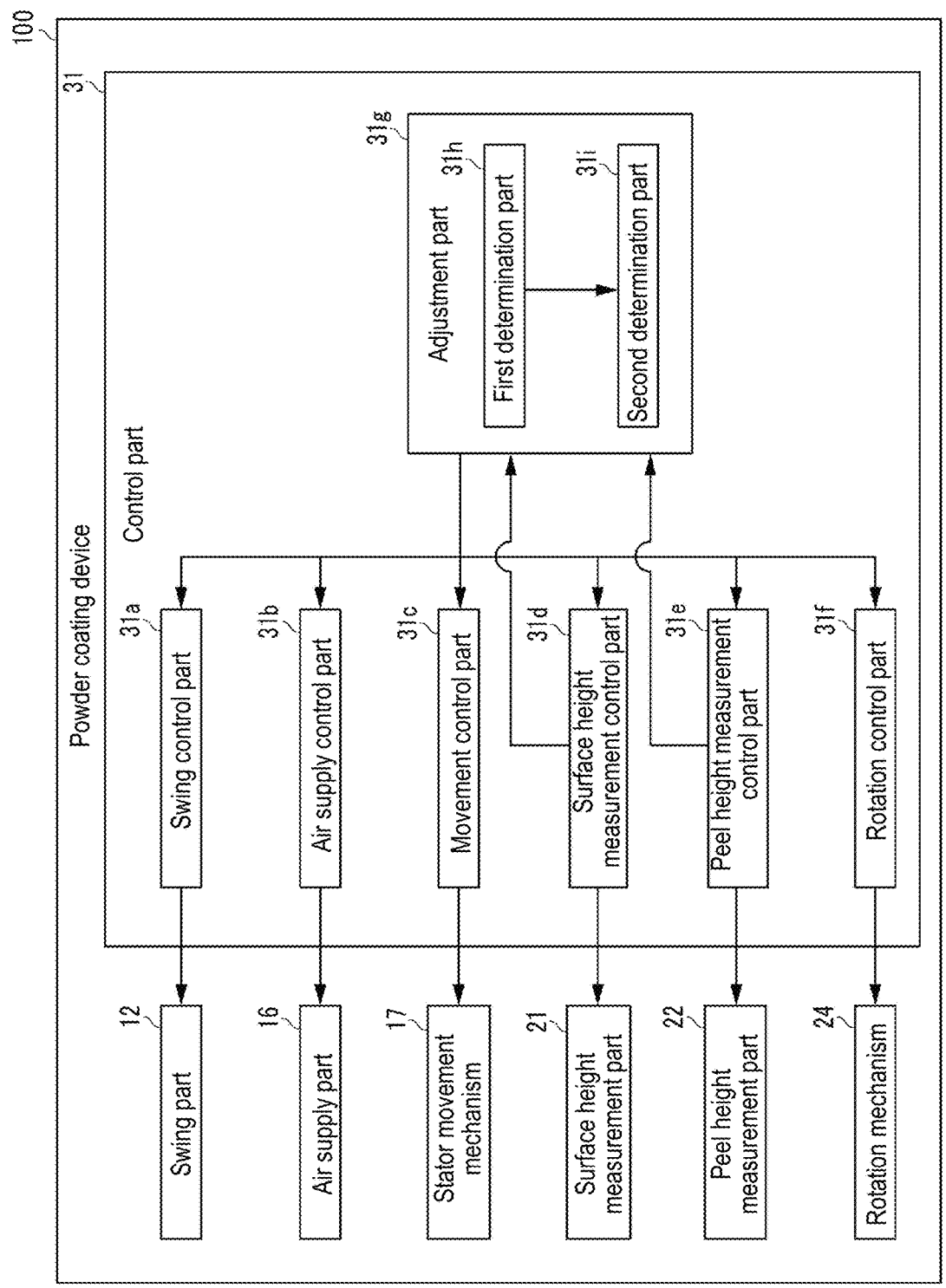
FIG. 6 is a block diagram of the powder coating device.

With reference to FIGS. 5 and 6, the powder coating device 100 according to an embodiment of the disclosure performs powder coating on the peeled parts 4e at the lower ends of the legs 4a of the coil segments 4 of the stator 1 by a flow dipping method.

The powder coating device 100 includes a powder flow tank 11 configured by an insulating resin (for example, an epoxy resin) and filled with a powder resin A having a particle diameter of, for example, 55 μm (0.055 mm), and a swing part 12 which swings the powder flow tank 11. The sides of the powder flow tank 11 are closed and the bottom surface is open. The swing part 12 has an eccentric vibration motor or the like, swings the central axis part of the powder flow tank 11, and swings the powder flow tank 11 in the lateral direction and the axial direction.

The powder coating device 100 includes a first porous plate 13 and a second porous plate 14 disposed below the powder flow tank 11, a porous plate holding part 15 which holds the first porous plate 13 and the second porous plate 14, and an air supply part 16. The first porous plate 13 and the second porous plate 14 correspond to a porous body of the disclosure.

The first porous plate 13 has multiple pores having a diameter of, for example, 0.01 mm, and the second porous plate 14 has multiple pores having a diameter of, for example, 2 mm, which is greater than the pore diameter of the first porous plate 13. Further, it is sufficient that at least the first porous plate 13 is provided, and the second porous plate 14 may not be provided. Further, three or more porous plates may be provided.

The porous plate holding part 15 includes a first holding plate 15a, a second holding plate 15b, and a third holding plate 15c. The first holding plate 15a is detachably mounted on the second holding plate 15b, and the first porous plate 13 is held between the first holding plate 15a and the second holding plate 15b.

The third holding plate 15c is detachably mounted on the second holding plate 15b, and the second porous plate 14 is held between the third holding plate 15c and the second holding plate 15b. Each of the porous plates 13 and 14 and each of the holding plates 15a to 15c are sealed with a ring-shaped rubber.

The air supply part 16 is disposed below the first porous plate 13 and supplies air upward toward the first porous plate 13. Further, the air supply part 16 is configured to be able to locally supply air toward the first porous plate 13. The air supply part 16 is configured to be able to supply air at an independent flow rate toward the first porous plate 13, particularly below the part forming an annular part where the peeled parts 4e of the lower ends of multiple coil segments 4 of the stator 1 are located when the lower end of the stator 1 is inserted into the powder resin A filled in the powder flow tank 11, for example, to supply air for each of the regions divided in the circumferential direction below the part forming the annular part.

Further, the powder coating device 100 includes a stator movement mechanism 17 which holds and moves the stator 1. The stator movement mechanism 17 is, for example, an articulated robot, and is configured to hold the stator 1 in a predetermined entry posture by a grip part at the tip thereof and allow the stator 1 to enter the powder flow tank 11 by a predetermined entry amount while maintaining this entry posture.

Further, the powder coating device 100 includes a surface height measurement part 21 which measures the surface height HA of the powder resin A, and a peel height measurement part 22 which measures the height (hereinafter referred to as the peel height) HB of the upper ends of the peeled parts 4e of the coil segments 4 of the stator 1. In addition, in the embodiment, since the surface height measurement part 21 and the peel height measurement part 22 have the same configuration, the description of the peel height measurement part 22 regarding the common configuration will be omitted.

The surface height measurement part 21 has a laser measurement instrument 23. The laser measurement instrument 23 measures the height HA from a predetermined reference surface (here, the upper end surface of the powder flow tank 11) to the upper surface of the powder resin A. Specifically, with reference to FIG. 7, the laser measurement instrument 23 includes laser reflection type first to eighth laser measurement parts 23a to 23h provided in order from the inner peripheral side to measure the surface height of the powder resin A at eight points.

As will be described in detail later, the protruding parts 4d including the peeled parts 4e of the coil segments 4 are inserted into the powder flow tank 11, and the surface height measurement part 21 measures the surface height HA of the powder resin A in the range in which the protruding parts 4d are inserted. Therefore, the first to eighth laser measurement parts 23a to 23h are disposed to measure the surface height HA of the powder resin A at each of the eight points where the protruding parts 4d of eight coil segments 4 are inserted. Specifically, the first to eighth laser measurement parts 23a to 23h each irradiate the surface of the powder resin A with laser light, receive the reflected light, and measure the surface height HA of the powder resin A based on the received reflected light.

The peel height measurement part 22 measures the peel height HB of the peeled parts 4e of eight coil segments 4 from the horizontal plane set on the stator 1, for example, the height (depth) HB of the upper end of the stator core 2 from the horizontal plane. The peel height measurement part 22 is, for example, a laser reflection type and three-dimensional camera type rangefinder.

Further, the surface height measurement part 21 and the peel height measurement part 22 rotate the first to eighth laser measurement parts 23a to 23h of the laser measurement instrument 23 in the circumferential direction of the stator core 2 by a rotation mechanism 24 (to be described later) which rotates around the central axis direction of the powder flow tank 11. In this way, the surface height HA of the powder resin A and the peel height HB of the peeled parts 4e of the coil segments 4 may be measured over the entire circumference.

The rotation mechanism 24 is configured by a motor 24a which is a driving source; a gear plate 24b which is engaged with the motor 24a via a gear (not shown) and is disposed on a circumference around the central axis direction of the powder flow tank 11; a sliding mechanism 24d on which the gear plate 24b is slidably carried on a fixed base 24c; a movement mechanism 24e which is disposed on the upper surface of the gear plate 24b to move the surface height measurement part 21 and the peel height measurement part 22 to the measurement position and the retracted position; and a mounting part 24f which is disposed at the tip of the movement mechanism 24e and mounts the surface height measurement part 21 and the peel height measurement part 22.

The surface height measurement part 21 is mounted on the lower surface side (powder flow tank 11 side) of the mounting part 24f, and the peel height measurement part 22 is mounted on the upper surface side (stator 1 side) of the mounting part 24f. In this way, the surface height measurement part 21 and the peel height measurement part 22 may simultaneously measure the measurement points at the same position (phase) in the circumferential direction.

Further, the powder coating device 100 includes a control part 31 which comprehensively controls each part. The control part 31 includes a swing control part 31a which controls the operation of the swing part 12, an air supply control part 31b which controls the operation of the air supply part 16, a movement control part 31c which controls the operation of the stator movement mechanism 17, a surface height measurement control part 31d which controls the operation of the surface height measurement part 21, a peel height measurement control part 31e which controls the operation of the peel height measurement part 22, and a rotation control part 31f which controls the operation of the rotation mechanism 24.

The control part 31 further includes an adjustment part 31g which adjusts the control amount of at least one of the swing part 12, the air supply part 16, and the stator movement mechanism 17 according to the surface height HA of the powder resin A measured by the surface height measurement part 21 and the height HB of the upper ends of the peeled parts 4e measured by the peel height measurement part 22.

The adjustment part 31g includes a first determination part 31h which adjusts the control amount of the stator movement mechanism 17, and a second determination part 31i which adjusts the control amounts of the swing part 12 and the air supply part 16. Specifically, the control amount of the stator movement mechanism 17 is the entry posture and the entry amount of the stator 1 into the powder flow tank 11, and the control amount of the swing part 12 is the swing amount of the swing part 12, and the control amount of the air supply part 16 is the flow rate of the air. The detailed adjustment of the control amounts by the adjustment part 31g will be described later.

Figure 8:
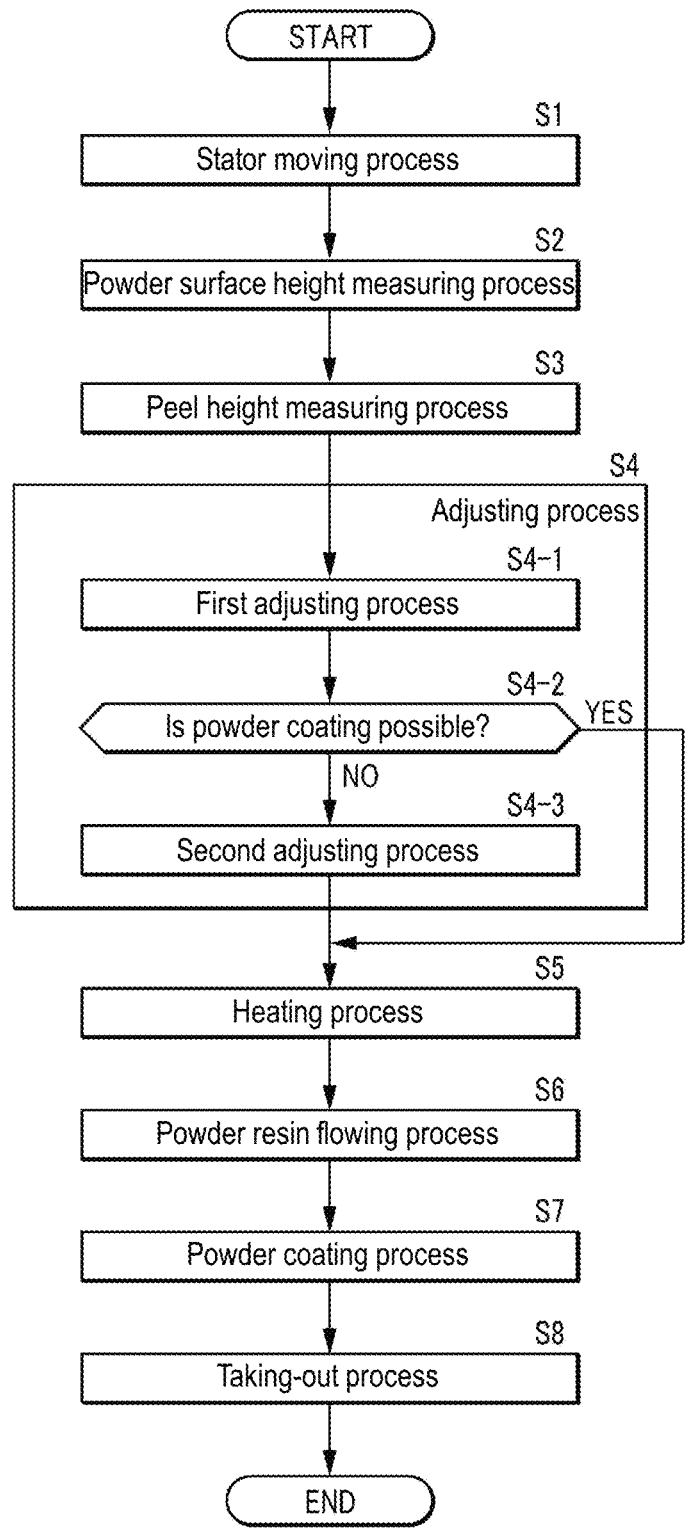
FIG. 8 is a flowchart showing a powder coating method according to an embodiment of the disclosure.

Hereinafter, the powder coating method according to an embodiment of the disclosure by using the above-described powder coating device 100 will be described with reference also to FIG. 8.

First, a stator moving process (S1) is performed in which the stator 1 is moved to a measurement position above the powder coating device 100 by the stator movement mechanism 17. This process is performed by the movement control part 31c of the control part 31. To describe the measurement position more specifically, it is a state where the central axis of the powder flow tank 11 and the central axis of the stator core 2 coincide with each other.

Then, a powder surface height measuring process (S2) in which the surface height HA of the powder resin A is measured by the surface height measurement part 21 and a peel height measuring process (S3) in which the peel height HB of the peeled parts 4e of the coil segments 4 of the stator 1 is measured by the peel height measurement part 22 are performed simultaneously. These processes are performed by the surface height measurement control part 31d and the peel height measurement control part 31e of the control part 31, and the measurement results are input to the adjustment part 31g of the control part 31.

Further, the powder surface height measuring process (S2) and the peel height measuring process (S3) do not have to be performed simultaneously, and in this case, which comes first does not matter.

Next, an adjusting process (S4) is performed in which the control amount of each part of the powder coating device 100 is adjusted based on the measurement results of the surface height HA of the powder resin A and the peel height HB.

Specifically, here, the surface height of the powder resin A and the peel height HB are classified into patterns, and the adjustment mode is selected based on the combination of these patterns.

More specifically, with reference to FIG. 9, the surface height HA of the powder resin A is classified into five patterns including "overall high," "overall low," "overall inclined," "locally low" and "locally uneven." In addition, the peel height HB is classified into five patterns including "overall shallow," "overall deep," "overall inclined," "locally deep," and "locally uneven." Then, the adjustment mode is selected based on the combination of these patterns. Further, shallow and deep are relative to a predetermined reference height.

Figure 7:
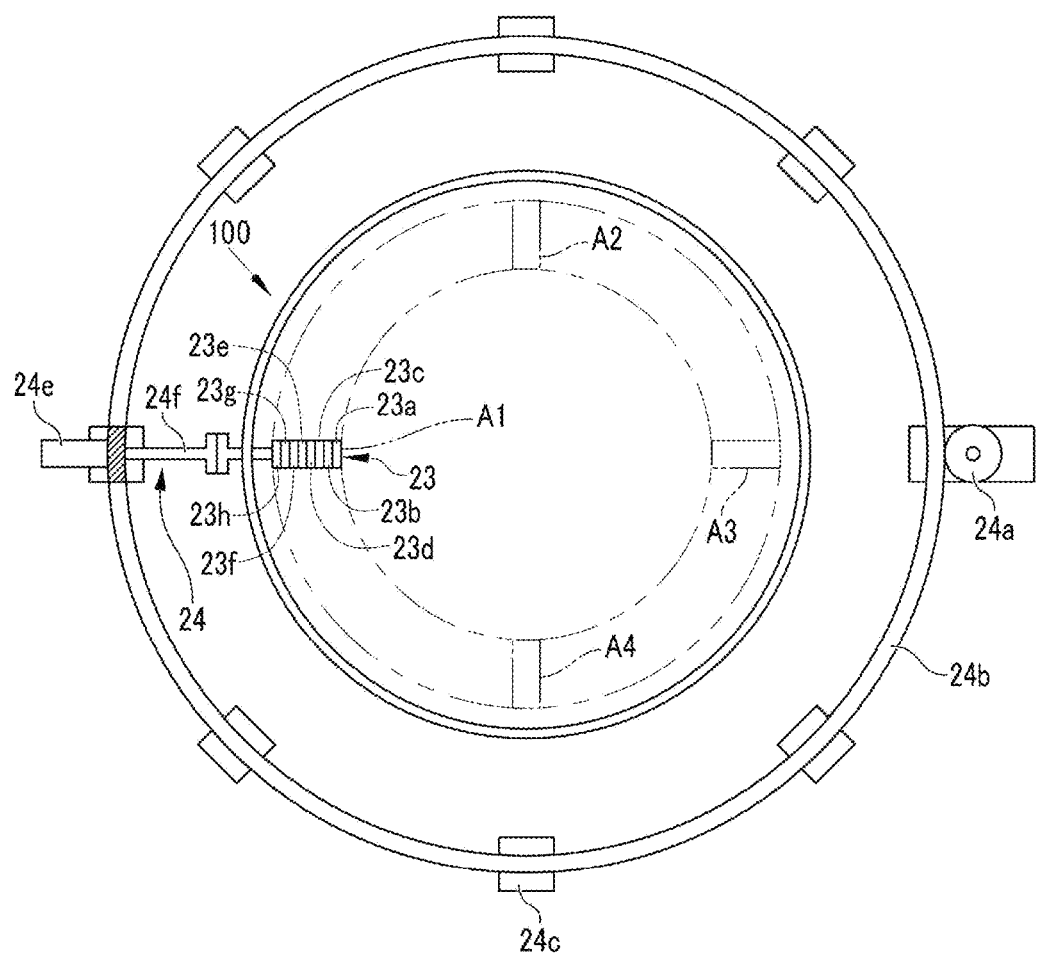
FIG. 7 is a schematic view schematically showing a surface height measurement part.
Figure 10A:
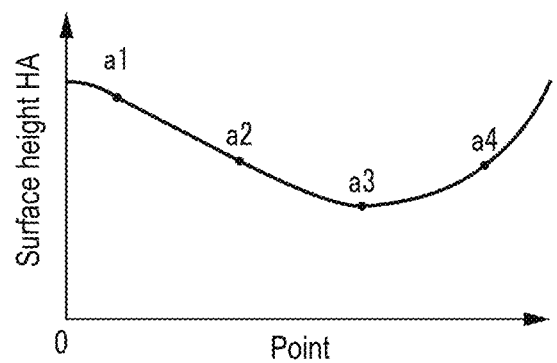
FIG. 10A is a graph showing an example of a measurement result of the surface height HA of the powder resin in the case where "overall inclined" is selected.
Figure 10B:
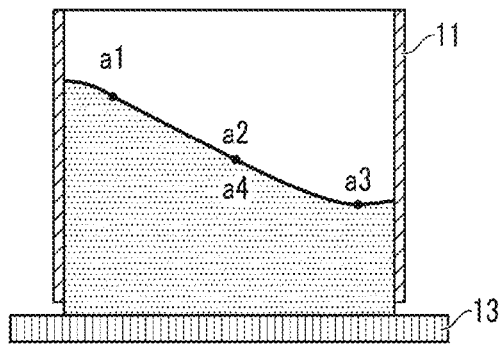
FIG. 10B is a schematic view schematically showing an example of a state of the powder resin housed in the powder flow tank in the case where "overall inclined" is selected.

To describe the pattern classification more specifically, the difference between "overall inclined," "locally low," and "locally uneven" of the surface height HA will be explained with reference to FIGS. 7 and 10 to 12. For example, in the case where A1 to A4 shown by two-dot chain lines in FIG. 7 are set as representative measurement points, when the values of the measurement results of the surface height HA of the powder resin at the measurement points A1 to A4 are set to a1 to a4, respectively, "overall inclined" is selected in the case of a1>a2≈a4>a3 as shown in FIGS. 10A and 10B, or in the case of a1<a2≈a4<a3.

Figure 11A:
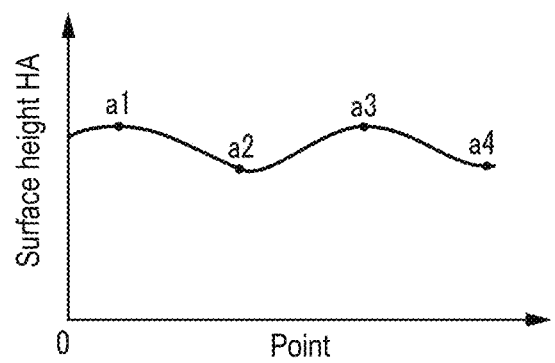
FIG. 11A is a graph showing an example of a measurement result of the surface height HA of the powder resin in the case where "locally low" is selected.
Figure 11B:
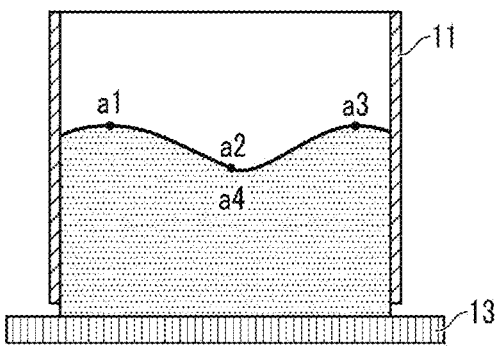
FIG. 11B is a schematic view schematically showing an example of a state of the powder resin housed in the powder flow tank in the case where "locally low" is selected.
Figure 12A:
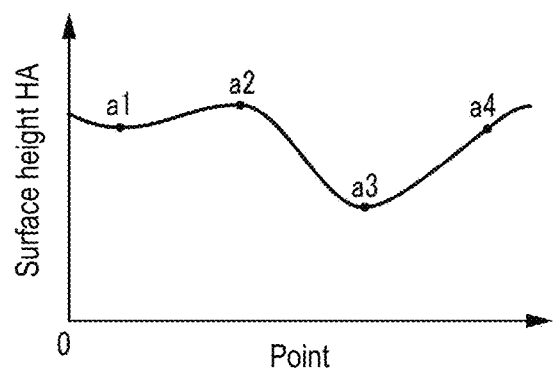
FIG. 12A is a graph showing an example of a measurement result of the surface height HA of the powder resin in the case where "locally uneven" is selected.
Figure 12B:
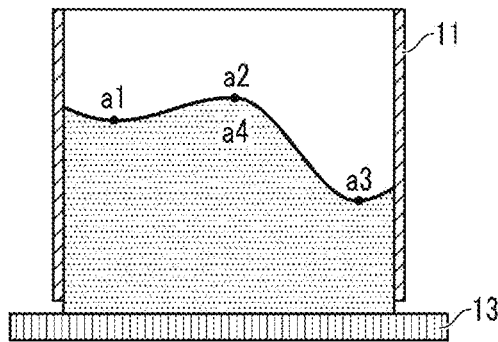
FIG. 12B is a schematic view schematically showing an example of a state of the powder resin housed in the powder flow tank in the case where "locally uneven" is selected.

Then, in the case of a1≈a3>a2≈a4 as shown in FIGS. 11A and 11B, or in the case of a1≈a3<a2≈a4, "locally low" is selected. Further, as shown in FIGS. 12A and 12B, in the case where only one value of a1 to a4 is high or low and the other values are substantially equal, "locally uneven" is selected. The pattern classification of the peel height HB is performed by the same method as the surface height HA of the powder resin A.

Then, in the case where the surface height HA of the powder resin A is "overall high," an adjustment mode is selected to eliminate the defect based on the pattern of the peel height HB. In the case where the peel height HB is "overall deep," the stator movement mechanism 17 is controlled by the movement control part 31c of the control part 31 in a powder coating process (S7) (to be described later) to increase the entry amount of the stator 1 into the powder flow tank 11 more than a predetermined reference amount. The increase amount of the entry amount from the reference amount is calculated based on the measurement result so that the peeled parts 4e of all the coil segments 4 are inserted into the powder resin A that flows all over them.

Further, in the case where powder coating cannot be performed on all of the peeled parts 4e simply by controlling the stator movement mechanism 17, the air supply part 16 may be controlled by the air supply control part 31b of the control part 31 in a powder resin flowing process (S6) (to be described later) to increase the flow rate of the air to be supplied from a predetermined reference amount to increase the overall surface height HA of the powder resin A.

Further, in the case where the surface height HA of the powder resin A is "overall high" and the peel height HB is "overall inclined," the stator movement mechanism 17 is controlled to incline the entry posture of the stator 1. The change amount of the entry posture from the predetermined reference value at this time is calculated to eliminate this inclination by obtaining the inclination of the peel height HB based on the measurement result.

Further, in the case where the surface height HA of the powder resin A is "overall high" and the peel height HB is "locally deep" or "locally uneven," the air supply part 16 is controlled to locally increase the flow rate of the air from a predetermined reference amount and supply the air to increase the height of the part filled with the powder resin A corresponding to the part where the peel height HB is deep or convex.

Further, in addition to this, the swing part 12 may be controlled by the swing control part 31a of the control part 31 in the powder resin flowing process (S6) (to be described later) to increase the swing amount from a predetermined reference amount. The swing amount is the swing angle, frequency, swing duration (time during which the swing continues until the stator 1 enters the powder resin A) and the like in which the swing part 14 swings the powder flow tank 11.

Further, in the case where the peel height HB is "overall shallow," an adjustment mode is selected to eliminate the defect based on the pattern of the surface height HA of the powder resin A. In the case where the surface height HA of the powder resin A is "overall low," the stator movement mechanism 17 is controlled to increase the entry amount of the peeled parts 4e. The increase amount from the reference value of the entry amount at this time is calculated based on the measurement result.

Further, in the case where powder coating cannot be performed on all of the peeled parts 4e simply by controlling the stator movement mechanism 17, the air supply part 16 is controlled to increase the overall surface height HA of the powder resin A.

Further, in the case where the peel height HB is "overall shallow" and the surface height HA of the powder resin A is "overall inclined," the stator movement mechanism 17 is controlled to incline the entry posture of the stator 1. The change amount of the entry posture from the predetermined reference value at this time is calculated to eliminate this inclination by obtaining the inclination of the surface height HA of the powder resin A based on the measurement result.

Further, in the case where the peel height HB is "overall shallow" and the surface height HA of the powder resin A is "locally low" or "locally uneven," the air supply part 16 is controlled to increase the flow rate of the air and supply the air to increase the height of the shallow part or the concave part of the surface height HA of the powder resin A. Further, in addition to this, control may be performed to swing the swing part 12.

Then, in the case where the surface height HA of the powder resin A is other than "overall high" and the peel height HB is other than "overall shallow," a combination of adjustment modes is selected to eliminate the defects based on the corresponding pattern. For example, in the case where the surface height HA of the powder resin A is "overall low" and the peel height HB is "overall inclined," the stator movement mechanism 17 is controlled to increase the entry amount of the peeled parts 4e, and the stator movement mechanism 17 is also controlled to eliminate the inclination of the peel height HB.

Further, in the case where powder coating cannot be performed on all of the peeled parts 4e simply by controlling the stator movement mechanism 17, the air supply part 16 may be controlled to increase the overall surface height HA of the powder resin A.

As described above, the adjusting process (S4) includes a first adjusting process (S4-1) in which the stator movement mechanism 17 is adjusted and a second adjusting process (S4-3) in which at least one of the swing part 12 and the air supply part 16 is adjusted in the case where it is expected that good powder coating cannot be performed only by adjusting the stator movement mechanism 17 (S4-2: NO). Further, the part of the adjustment part 31g for determining the adjustment in the first adjusting process (S4-1) is the first determination part 31h, and the part of the adjustment part 31g for determining the adjustment in the second adjusting process (S4-2) is the second determination part 31i.

This is because when the entry posture and the entry amount of the stator 1 whose adjustments are determined by the first determination part 31h are adjusted, the entry posture and the entry amount of the stator 1 change specifically, but even if the flow rate of the air and the swing amount whose adjustments are determined by the second determination part 31i are adjusted, the state of the surface height HA of the powder resin A does not change specifically. Therefore, if possible, the cycle time as a whole may be shortened by first making adjustments based on the determination of the first determination part 31h, which may solve the defects reliably and quickly.

Further, in the case of adjusting the flow rate of the air or the swing amount, after starting the powder resin flowing process (S6) and before inserting the stator 1 into the powder resin A in the powder coating process (S7), it is preferable to measure the surface height HA of the powder resin A by the surface height measurement part 21 and confirm whether the desired surface height HA has been obtained by the adjustment. Then, in the case where the desired surface height HA is not obtained, it is preferable that the adjusting process (S4) is performed again, or the operator adds the powder resin A to the powder flow tank 11, or the like.

Further, the adjustment modes in the adjusting process (S4) are not limited to those described above. For example, since the swing part 12 swings the powder flow tank 11 in the lateral direction, the outer peripheral part of the powder flow tank 11 swings more than the central part, so the powder resin A moves from the central part of the powder flow tank 11 toward the outer peripheral part. Therefore, in the case where the surface height HA of the powder resin A is "concave in the central part," it is possible to adjust the swing amount by the swing part 12 to increase from a predetermined reference amount.

In addition, in the case where it is assumed that powder coating cannot be performed on all of the peeled parts 4e by adjusting any of the entry posture and the entry amount of the stator 1, the flow rate of the air, and the swing amount, it is necessary for the operator to perform processing such as adding the powder resin A to the powder flow tank 11.

Next, a heating process (S5) is performed in which the protruding parts 4d including the peeled parts 4e of the coil segments 4 of the stator 1 is heated to a temperature greater than or equal to the melting temperature of the powder resin A by a heating device (not shown).

Further, the powder resin flowing process (S6) is performed in which the swing part 12 is driven to swing the powder resin A filled in the powder flow tank 11, and the air supply part 16 is driven to supply air from the air supply part 16 to the powder flow tank 11, and the powder resin A filled in the powder flow tank 11 flows.

In the second adjusting process (S4-3), in the case where the second determination part 31i performs the adjustment to change the swing amount of the swing part 12 or the flow rate of the air of the air supply part 16 from the reference value, the swing part 12 or the air supply part 16 is controlled to be driven based on the adjusted value. Further, regarding the heating process (S5) and the powder resin flowing process (S6), which comes first does not matter, or they may be performed simultaneously.

Next, the powder coating process (S7) is performed in which the stator movement mechanism 17 is driven to hold the stator 1 in a predetermined posture and move downward, and the peeled parts 4e at the lower ends of the coil segments 4 of the stator 1 are inserted into the powder flow tank 11 for powder coating. In the first adjusting process (S4-1), in the case where the first determination part 31h performs the adjustment to change the entry posture or the entry amount of the stator 1 by the stator movement mechanism 17 from the reference value, the stator movement mechanism 17 is controlled to be driven based on the adjusted value.

In this way, the powder resin A flowing in the powder flow tank 11 comes into contact with the peeled parts 4e. Since the peeled parts 4e are heated to a temperature greater than or equal to the melting temperature of the powder resin A, the powder resin A in contact with the peeled parts 4e is melted to form a coating film, and powder coating is performed on the peeled parts 4e.

After powder coating is performed for a predetermined time, a taking-out process (S8) is performed in which the driving of the swing part 12 and the air supply part 16 is stopped, and further, the stator movement mechanism 17 is driven to move the stator 1 and retract it from above the powder flow tank 11, and the stator 1 is taken out from the powder flow tank 11. In this way, the peeled parts 4e at the lower ends of the coil segments 4 of the stator 1 taken out from the powder flow tank 11 are powder-coated and are in an insulating state.

As described above, according to the embodiment, at least one of the flow rate of the air, the swing amount of the powder flow tank 11, the entry posture of the stator 1 and the entry amount of the stator 1 is adjusted according to the measurement result of the surface height HA of the powder resin A filled in the powder flow tank 11 and the measurement result of the height HB of the upper ends of the peeled parts 4e of the coil segments 4. Therefore, it is possible to automatically perform appropriate adjustment after obtaining the combination of the variation in the surface height HA of the powder resin A and the variation in the height HB of the upper ends of the peeled parts 4e of the coil segments 4. In this way, it is possible to reliably perform powder coating on all of the peeled parts 4e of the coil segments 4, and it is possible to suppress the consumption amount of the powder resin A, whereby is possible to reduce the operation of adding the powder resin by the operator and the like.

Although embodiments of the disclosure have been described above, the disclosure is not limited thereto, and the configuration and the form of the powder coating device 100 and the workpiece to be powder coated may be appropriately changed.

Further, a case has been described in which the air supply part 16 locally supplies air to adjust the surface height HA of the powder resin A to eliminate the local unevenness and inclination. However, the disclosure is not limited thereto, and the air supply part 16 may supply air uniformly as a whole. In this case, to eliminate the local unevenness and inclination of the surface height HA of the powder resin A, adjustments other than locally increasing the flow rate of the air may be selected.

Further, in the embodiment, the surface height measurement part 21 and the peel height measurement part 22 rotate the first to eighth laser measurement parts 23a to 23h of the laser measurement instrument 23 in the circumferential direction of the stator core 2 by the rotation mechanism 24. However, the disclosure is not limited thereto, and for example, a measurement instrument may be provided at each measurement point.

What is claimed is:

1. A powder coating device which performs powder coating by inserting a plurality of parts at a lower end of a workpiece where an insulating coating has been peeled off into a powder flow tank with closed sides and filled with a powder resin, the powder coating device comprising:
   a surface height measurement part, comprising a sensor which measures a surface height of the powder resin filled in the powder flow tank at a first plurality of points;
   a peel height measurement part, comprising a sensor which measures a height of upper ends of the plurality of parts of the workpiece where the insulating coating has been peeled off at a second plurality of points;
   a swing part, comprising a motor which vibrates the powder flow tank and swings the powder resin filled in the powder flow tank;
   an air supply part which supplies air toward the powder flow tank via a porous body provided below a bottom surface that is opened of the powder flow tank, and which flows the powder resin filled in the powder flow tank; and
   an adjustment part which adjusts at least one of a flow rate of the air, a swing amount of the powder flow tank, an entry posture of the workpiece with respect to the powder flow tank and an entry amount of the workpiece with respect to the powder flow tank according to measurement results of the surface height measurement part and the peel height measurement part.

2. The powder coating device according to claim 1, wherein the adjustment part comprises:
   a first determination part which determines adjustment of the entry posture of the workpiece and the entry amount of the workpiece; and
   a second determination part which determines adjustment of the flow rate of the air and the swing amount of the powder flow tank,
   wherein the second determination part determines the adjustment after the first determination part determines the adjustment.

3. The powder coating device according to claim 1, wherein the surface height measurement part and the peel height measurement part simultaneously measure the height of the workpiece and the surface height of the powder resin in a same phase with respect to a circumferential direction of the powder flow tank.

4. The powder coating device according to claim 2, wherein the surface height measurement part and the peel height measurement part simultaneously measure the height of the workpiece and the surface height of the powder resin in a same phase with respect to a circumferential direction of the powder flow tank.

5. A powder coating method comprising:
- filling a powder resin into a powder flow tank with closed sides;
- measuring a surface height of the powder resin filled in the powder flow tank at a first plurality of points;
- measuring a height of upper ends of a plurality of parts at a lower end of a workpiece where an insulating coating has been peeled off at a second plurality of points;
- vibrating the powder flow tank and swinging the powder resin filled in the powder flow tank;
- supplying air toward the powder flow tank via a porous body provided below a bottom surface that is opened of the powder flow tank and flowing the powder resin filled in the powder flow tank;
- inserting a part including the plurality of parts at the lower end where the insulating coating has been peeled off with a predetermined entry posture of the workpiece into the powder resin flowing in the powder flow tank by a predetermined entry amount with respect to the powder flow tank; and
- adjusting at least one of a flow rate of the air, a swing amount of the powder flow tank, the entry posture of the workpiece with respect to the powder flow tank and the entry amount of the workpiece with respect to the powder flow tank according to the measured surface height of the powder resin and the measured height of the upper ends of the plurality of parts of the workpiece where the insulating coating has been peeled off, wherein the power coating method is performed by a powder coating device which performs powder coating by inserting the plurality of parts at the lower end of the workpiece where the insulating coating has been peeled off into the powder flow tank with closed sides and filled with the powder resin, the powder coating device comprising:
- a surface height measurement part which measures the surface height of the powder resin filled in the powder flow tank at the first plurality of points;
- a peel height measurement part which measures the height of upper ends of the plurality of parts of the workpiece where the insulating coating has been peeled off at the second plurality of points;
- a swing part which vibrates the powder flow tank and swings the powder resin filled in the powder flow tank;
- an air supply part which supplies air toward the powder flow tank via the porous body provided below the bottom surface that is opened of the powder flow tank, and which flows the powder resin filled in the powder flow tank; and
- an adjustment part which adjusts at least one of the flow rate of the air, the swing amount of the powder flow tank, the entry posture of the workpiece with respect to the powder flow tank and the entry amount of the workpiece with respect to the powder flow tank according to measurement results of the surface height measurement part and the peel height measurement part.

\* \* \* \* \*